United States Patent
Bruford et al.

(10) Patent No.: US 7,090,276 B1
(45) Date of Patent: Aug. 15, 2006

(54) GRAB HANDLE FOR USE WITH SUPPLEMENTAL TAILGATE ON PICK-UP TRUCKS

(75) Inventors: Steve Bruford, West Bloomfield, MI (US); Larry Holt, Uxbridge (CA); Charles Bambenek, Farmington, MI (US); Jeff Firzlaff, Royal Oak, MI (US)

(73) Assignees: Ford Global Technologies, LLC, Dearborn, MI (US); Multimatic, Inc., Markham (CA)

( * ) Notice: Subject to any disclaimer, the term of this patent is extended or adjusted under 35 U.S.C. 154(b) by 0 days.

(21) Appl. No.: 11/236,133

(22) Filed: Sep. 27, 2005

(51) Int. Cl.
*B62D 33/03* (2006.01)
(52) U.S. Cl. .................. 296/62; 296/1.02; 296/26.1
(58) Field of Classification Search ............ 296/26.08, 296/26.1, 26.09, 26.11, 51, 57.1, 61, 62, 1.02
See application file for complete search history.

(56) References Cited

U.S. PATENT DOCUMENTS

| | | | | |
|---|---|---|---|---|
| 5,205,603 A | * | 4/1993 | Burdette, Jr. ................. | 296/62 |
| 6,364,392 B1 | * | 4/2002 | Meinke ........................ | 296/62 |
| 6,454,338 B1 | * | 9/2002 | Glickman et al. ............ | 296/62 |
| 6,640,929 B1 | * | 11/2003 | Korpi .......................... | 182/127 |
| 6,918,624 B1 | * | 7/2005 | Miller et al. .................. | 296/62 |
| 6,964,444 B1 | * | 11/2005 | Chumley et al. ............. | 296/62 |
| 2004/0113450 A1 | * | 6/2004 | Fielding ....................... | 296/62 |
| 2004/0227368 A1 | * | 11/2004 | Seksaria et al. ........... | 296/26.1 |

* cited by examiner

*Primary Examiner*—Jason Morrow
(74) *Attorney, Agent, or Firm*—Gigette M. Bejin; Miller Law Group, PLLC

(57) ABSTRACT

A pivotable grab handle device is movable between a stowed position, which is positioned within a mating cavity formed in the main tailgate structure, and a deployed position that projects upwardly above the top surface of a lowered main tailgate structure. The grab handle device is mounted on a retainer bracket that is affixed to a pivot bracket mounted to the top surface of the lowered main tailgate structure. When pivotally raised into the deployed position, the grab handle allows a person using a supplemental tailgate assembly configured into a step function extending below the plane of the lowered main tailgate structure to be stabilized while climbing onto the cross member of the supplemental tailgate assembly and onto the top surface of the lowered main tailgate structure.

17 Claims, 6 Drawing Sheets

GRAB HANDLE FOR USE WITH SUPPLEMENTAL TAILGATE ON PICK-UP TRUCKS

FIELD OF THE INVENTION

This invention relates to the utilization of a supplemental tailgate assembly housed with the tailgate of a pick-up truck and, more particularly, to a grab handle device to facilitate the use of the supplemental tailgate assembly as a step to gain access to the cargo area of the pick-up truck bed.

BACKGROUND OF THE INVENTION

Conventionally, pickup trucks include a tailgate at the back of a bed that closes off a cargo box. Often times, the truck bed is not long enough to hold the cargo, so truck bed extenders have been developed. The truck bed extenders work in conjunction with the open tailgate in order to provide additional length to the bed. Some of the bed extenders mount to the outside of the tailgate or to the box itself, which may be convenient for deployment, but they tend to interfere with cargo space in the box since the bed extender, when not in use, protrudes into the box. Moreover, it is typical for the vehicle operator to employ the extender only occasionally, so it is generally undesirable to have the extender exposed at all times, which detracts from the attractiveness of the vehicle.

Additionally, it is sometimes desirable to have an extender that can provide other functions in addition to a bed extender, such as a box extender function—an upwardly extending structure from the rearmost edge of an open tailgate that mimics the function of a closed tailgate. Such arrangements are particularly useful for carrying a load that is longer than the bed, but needs rearward support, such as provided by a closed tailgate, in order to prevent the load from falling rearwardly off the pick-up truck. Again, though, typical box extenders that provide adequate functionality are externally mounted and not only detract from the vehicle appearance when not in use but also require changes to the box for mounting such extenders. Also, most of these types of extenders are very cumbersome to deploy and later stow away, thus being undesirable for the operator to use. Such functions may be provided with simple ergonomic operation of the assembly, while still allowing for an attractive appearance for the vehicle when the extender is stowed during periods of non-use. Thus, while the exterior mounted extenders may be able to perform multiple functions, they still suffer from the drawbacks of an unattractive appearance and taking up room in the bed even when not in use.

Positioning the extended supplemental tailgate structure generally perpendicularly to the plane of the main tailgate structure, while the main tailgate structure is moved to an open position such that the plane of the tailgate structure is substantially parallel to the bed of the pickup truck, places the extended supplemental tailgate structure in an orientation that is substantially parallel to the main tailgate structure when the main tailgate structure is in a normal closed position. In such an extended position, the supplemental tailgate can provide a restriction to the rearward movement of objects located on the bed of the pickup truck. Furthermore, such an extended position of the supplemental tailgate can provide support for objects placed on top of the supplemental tailgate.

Positioning the extended supplemental tailgate structure such that the supplemental tailgate structure hangs below the plane of the main tailgate structure permits the cross member of the supplemental tailgate to be utilized as a step. In fact, U.S. Pat. No. 6,918,624, granted on Jul. 19, 2005, from U.S. patent application Ser. No. 10/969,413, filed on Oct. 20, 2004, teaches that the cross member of the supplemental tailgate assembly can incorporate a flip-out step that enlarges the surface of the underside of the cross member of the supplemental tailgate structure to enhance the use thereof as a step. Such utilization of the supplemental tailgate assembly assists the operator in gaining physical access to the cargo area of the pick-up truck, which is particularly helpful whenever the bed of the pick-up truck to positioned substantially above the ground surface.

In some instances, it would be helpful for the person utilizing the step function of the supplemental tailgate assembly to have an extraneous structure to grasp for purposes of stability while climbing onto the step and then unto the top surface of the opened tailgate. Alternatively, it would also be helpful in some circumstances for the person utilizing the step function of the supplemental tailgate to have some extraneous structure for stability purposes while descending from the main tailgate structure via the supplemental tailgate assembly onto the ground.

Accordingly, it would be desirable to provide a stabilizing support structure positioned for utilization while the supplemental tailgate assembly is positioned as a step, while being positionable in a storage configuration that would not interfere with the conventional operation of the cargo bed, or the operation of the supplemental tailgate assembly in functions other than as a step.

SUMMARY OF THE INVENTION

It is an object of this invention to overcome the aforementioned disadvantages of the known prior art by providing a grab handle device stowable within the main tailgate structure to be deployed as needed when the supplemental tailgate assembly is being utilized as a step for accessing the cargo bed of the pick-up truck.

It is a feature of this invention that the grab handle device can be stored into the surface of the main tailgate structure to permit the full length of the cargo bed and lowered tailgate to be utilized.

It is another feature of this invention that the grab handle apparatus is pivotally mounted to permit convenient deployment thereof when needed.

It is an advantage of this invention that the grab handle device can be stowed within a mating cavity formed into the top surface of the lowered main tailgate structure.

It is another feature of this invention that the grab handle device can be extended a substantial height above the top surface of the lowered main tailgate structure.

It is another advantage of this invention that the substantial height of the grab handle device above the top surface of the lowered main tailgate structure allows the grab handle to be utilized effectively while standing on the main tailgate structure.

It is another object of this invention to provide an extraneous structure that can be used to stabilize a person using the supplemental tailgate assembly as a step to gain physical access into the cargo bed of a pick-up truck.

It is a further object of this invention to provide a grab handle device operable in conjunction with a supplemental tailgate assembly that is durable in construction, inexpensive of manufacture, carefree of maintenance, facile in assemblage, and simple and effective in use.

These and other objects, features and advantages are accomplished according to the instant invention by providing a pivotable grab handle device that is movable between a stowed position, which is positioned within a mating cavity formed in the main tailgate structure, and a deployed position that projects upwardly above the top surface of a lowered main tailgate structure. The grab handle device is mounted on a retainer bracket that is affixed to a pivot bracket mounted to the top surface of the lowered main tailgate structure. When pivotally raised into the deployed position, the grab handle allows a person using a supplemental tailgate assembly configured into a step function extending below the plane of the lowered main tailgate structure to be stabilized while climbing onto the cross member of the supplemental tailgate assembly and onto the top surface of the lowered main tailgate structure.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
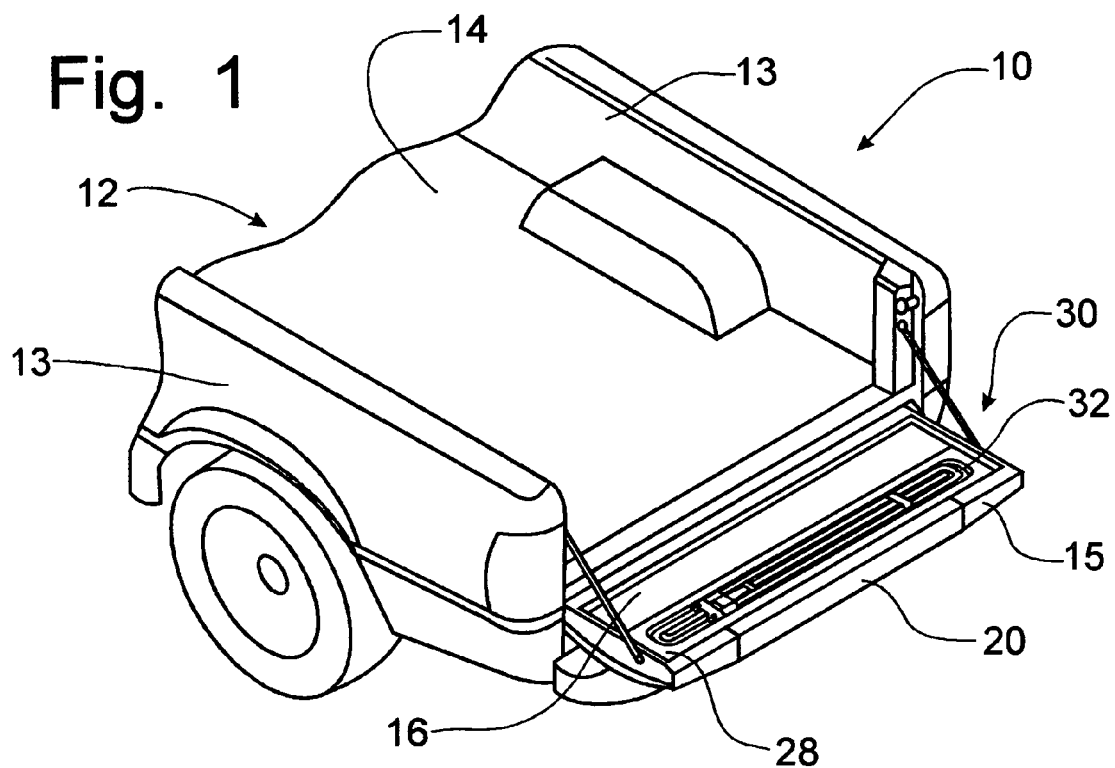
FIG. 1 is a partial perspective view of a cargo bed of a pick-up truck incorporating the principles of the instant invention, the pivotable grab handle being depicted in the stowed position, the main tailgate structure is lowered into the open position with the supplemental tailgate being stored internally thereon.
Figure 2:
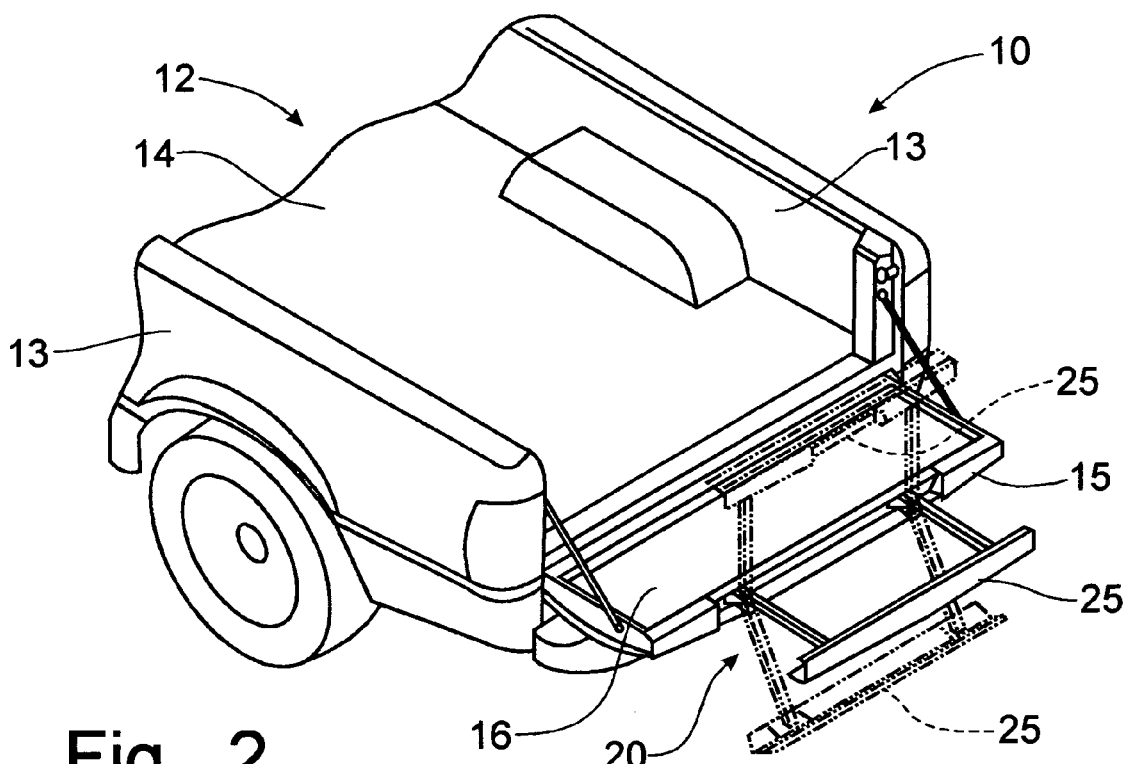
FIG. 2 is a perspective view of a pick-up truck cargo bed similar to that of FIG. 1, but with the supplemental tailgate assembly being extended from the stored position internally of the main tailgate structure, the pivotal movement of the supplemental tailgate structure upwardly and downwardly being depicted in phantom, the grab handle being deleted for purposes of clarity.
Figure 3:
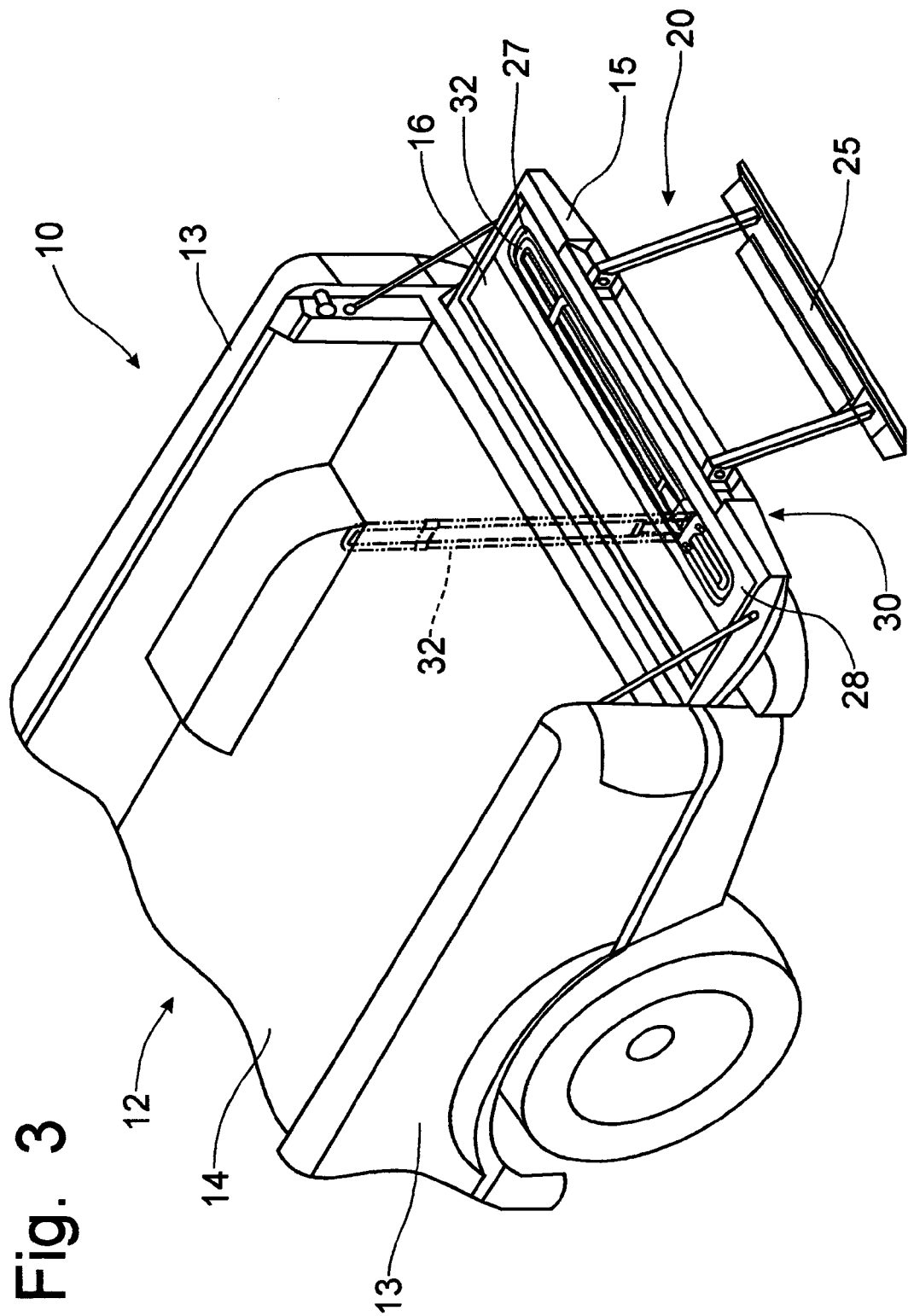
FIG. 3 is an enlarged perspective view of a pick-up truck cargo bed similar to that of FIGS. 1 and 2, but with the supplemental tailgate assembly being lowered into the step function, the grab handle being shown in the deployed position in phantom.

Referring to FIGS. 1–3, a pick-up truck cargo bed is provided with a main tailgate structure incorporating the principles of the instant invention. Any left and right references are used as a matter of convenience and are determined by standing at the rear of the cargo bed where the tailgate is pivotally mounted and facing the cargo bed, the normal direction of travel of the pick-up truck.

The pick-up truck 10 is conventionally manufactured with a cargo bed 12 forming the rearward portion of the vehicle 10. The cargo bed 12 includes generally vertical, upright side walls 13 having a floor member 14 extending generally horizontally therebetween. The tailgate 15 extends transversely above the floor 14 between the side walls 13 at the rearwardmost portion of the cargo bed 12. The tailgate 15 is pivotally mounted to the floor 14 and is movable between an upright closed position that is oriented perpendicularly to the floor 14 and a lowered open position that forms an extension of the floor 14 rearwardly of the side walls 13, as is shown in the drawings.

A supplemental tailgate assembly 20 of the type shown and described in U.S. patent application Ser. No. 10/969,413, now issued as U.S. Pat. No. 6,918,624, on Jul. 19, 2005, the contents of which are incorporated herein by reference. Such a supplemental tailgate assembly 20 can be stored within the interior of the tailgate 15 until deployed with the tailgate 15 lowered into the open position and the supplemental tailgate assembly 20 oriented generally vertically to serve as a substitute tailgate while the top surface of the lowered tailgate 15 serves as an extension of the cargo bed 12. As is depicted in phantom in FIG. 2, the supplemental tailgate assembly 20 is also pivotally movable into a lowered position such that the cross member 22 is lower than the main tailgate structure. As is disclosed in the aforementioned U.S. patent Ser. No. 10/969,413, the cross member 25 can also incorporate a flip-out step member (not shown) that enhances the use of the cross member 25 as a step.

With the supplemental tailgate 20 positioned below the main tailgate structure 15 to perform the step function of the supplemental tailgate 20, a user of the assembly 20 can step upon the cross member 25, and any extended step member (not shown) if provided, and be assisted in making the next step on onto the top surface 16 of the lowered tailgate 15, thereby providing physical access to the cargo bed 12 and anything stored thereon.

Climbing onto the cargo bed 12, can be facilitated by the use of a grab handle assembly 30 by which the person climbing onto the cross member 25 of the lowered supplemental tailgate assembly 20 can be stabilized while ascending the supplemental tailgate 20 and the top surface 16 of the lowered tailgate 15. Preferably, the grab handle assembly 30 will be capable of being deployed to assist a person descending from the main tailgate 15 to the surface of the ground through the use of the supplemental tailgate assembly 20.

Figure 4:
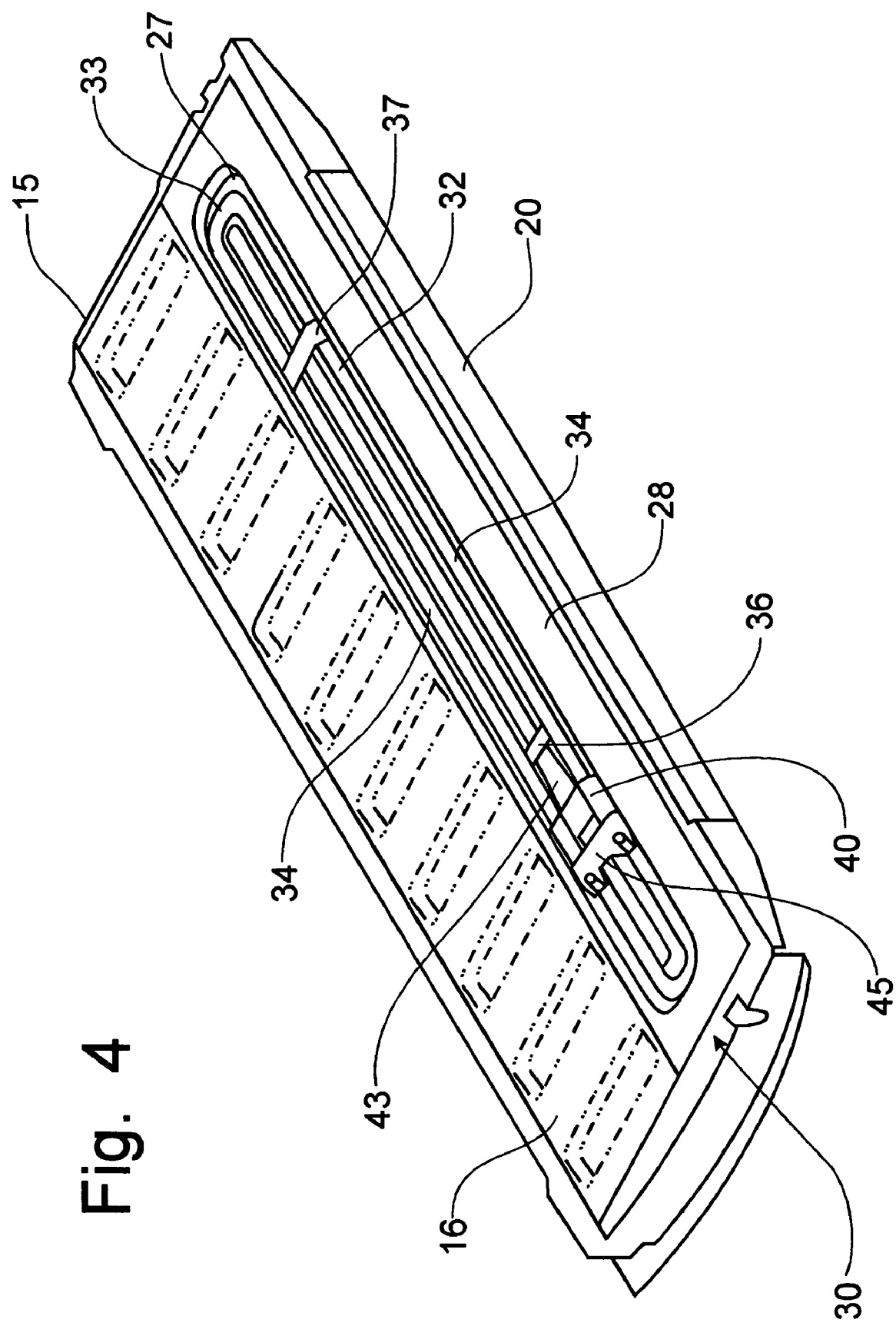
FIG. 4 is an enlarged perspective view of the main tailgate structure similar to that shown in FIG. 1 with the grab handle being placed in the stowed position and the supplemental tailgate being stored internally of the main tailgate structure.

The grab handle assembly 30 includes an elongated handle member 32 that is oriented transversely across the top surface 16 of the tailgate 15. The handle member 32 is positionable in a lowered stowed position, best seen in FIG. 4, received within a cradle 27 formed as part of a cover panel 28 into a mating shape with respect to the handle member 32. When the handle member 32 is placed in the stowed position in the cradle 27, the handle member 32 is recessed into the top surface 16 of the main tailgate structure 15 so as to not interfere with the normal operation of the cargo bed 12.

Figure 6:
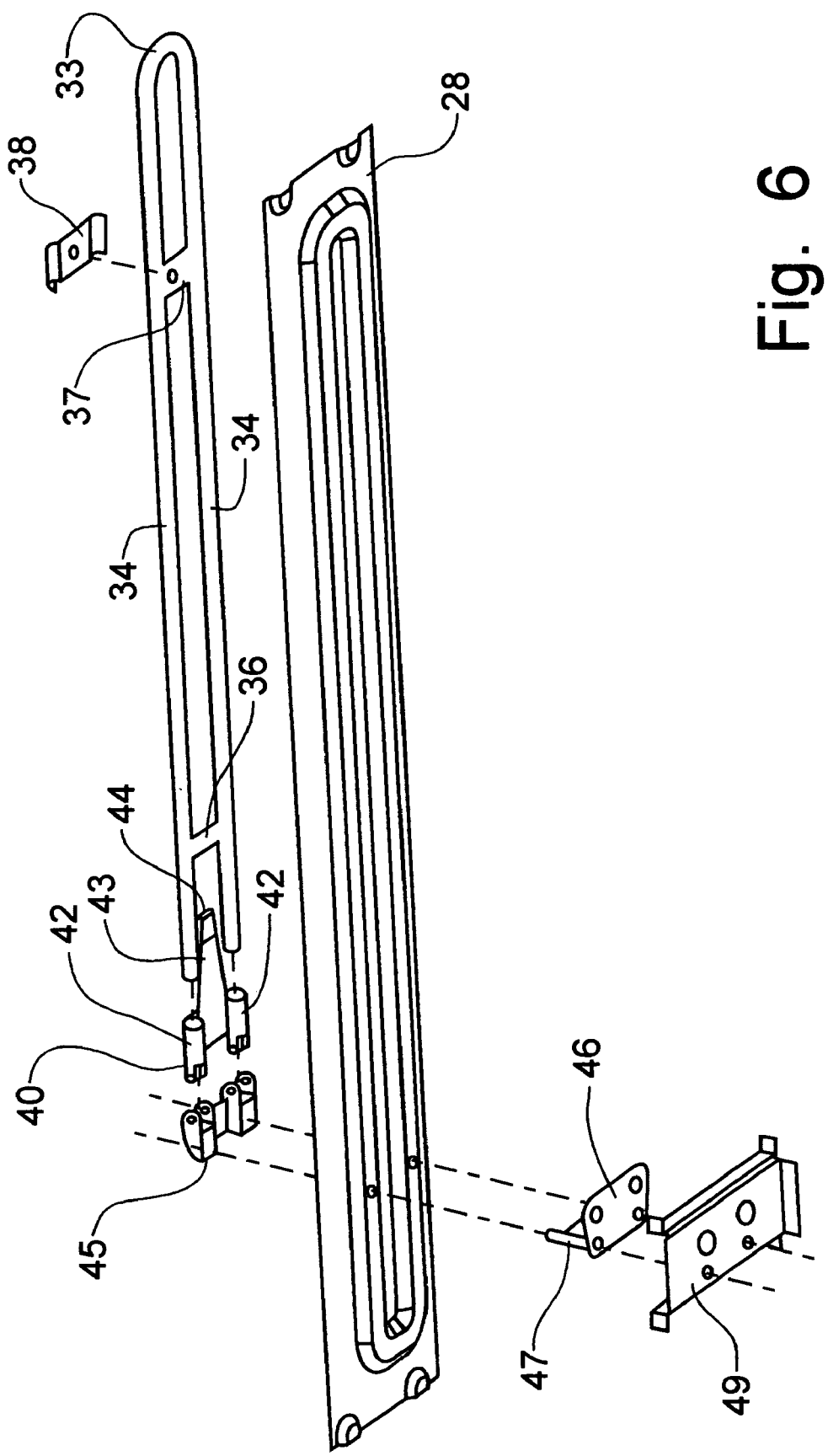
FIG. 6 is an enlarged exploded perspective view of the grab handle assembly looking from below the assembly.
Figure 7:
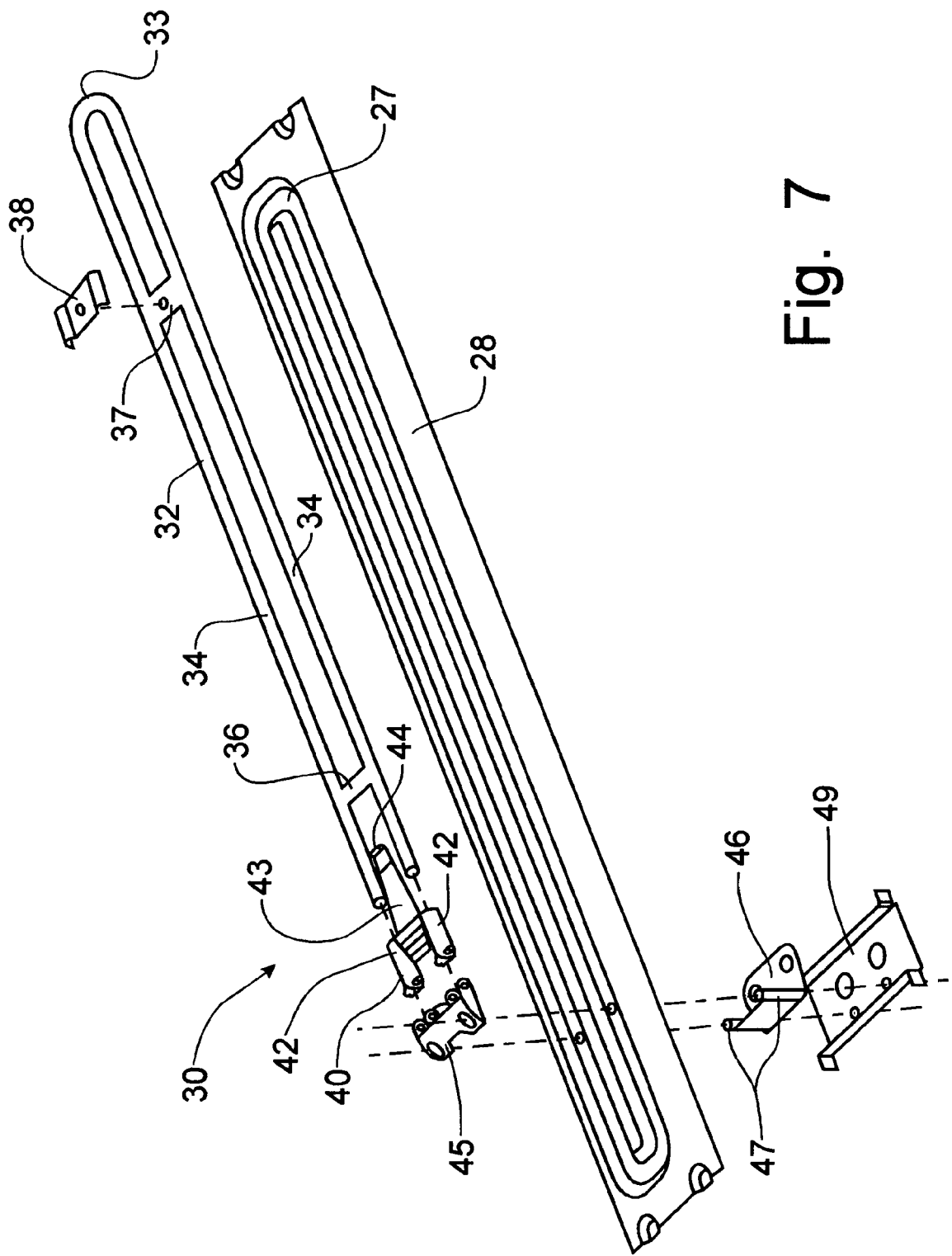
FIG. 7 is an enlarged exploded perspective view of the grab handle assembly looking from above the assembly.

The handle member 32 is preferably formed with a bight portion 33 from which a pair of elongated legs 34 extends. The legs 34 are received within a retainer bracket 40 that is formed with a pair of sleeves 42 into which the legs 34 fit. The retainer bracket 40 is also formed with a support tongue 43 that extends from between the sleeves 42 into engagement with a first transverse brace 36 that interconnects the two legs 34 to provide strength and stability to the grab handle member 32. The tongue 43, as is best seen in FIG. 7, is formed with a lip 44 that wraps around the edge of the brace 36 to provide enhanced engagement therebetween. A distal second transverse brace 37 positioned near the bight portion 33 adds further strength and stability to the grab handle member 32. A grip member 38, best seen in FIGS. 6 and 7, can be mounted on the second transverse brace 37 to facilitate grasping of the brace 37 and handle member 32 by a person using the step function of the supplemental tailgate assembly 20.

Figure 5:
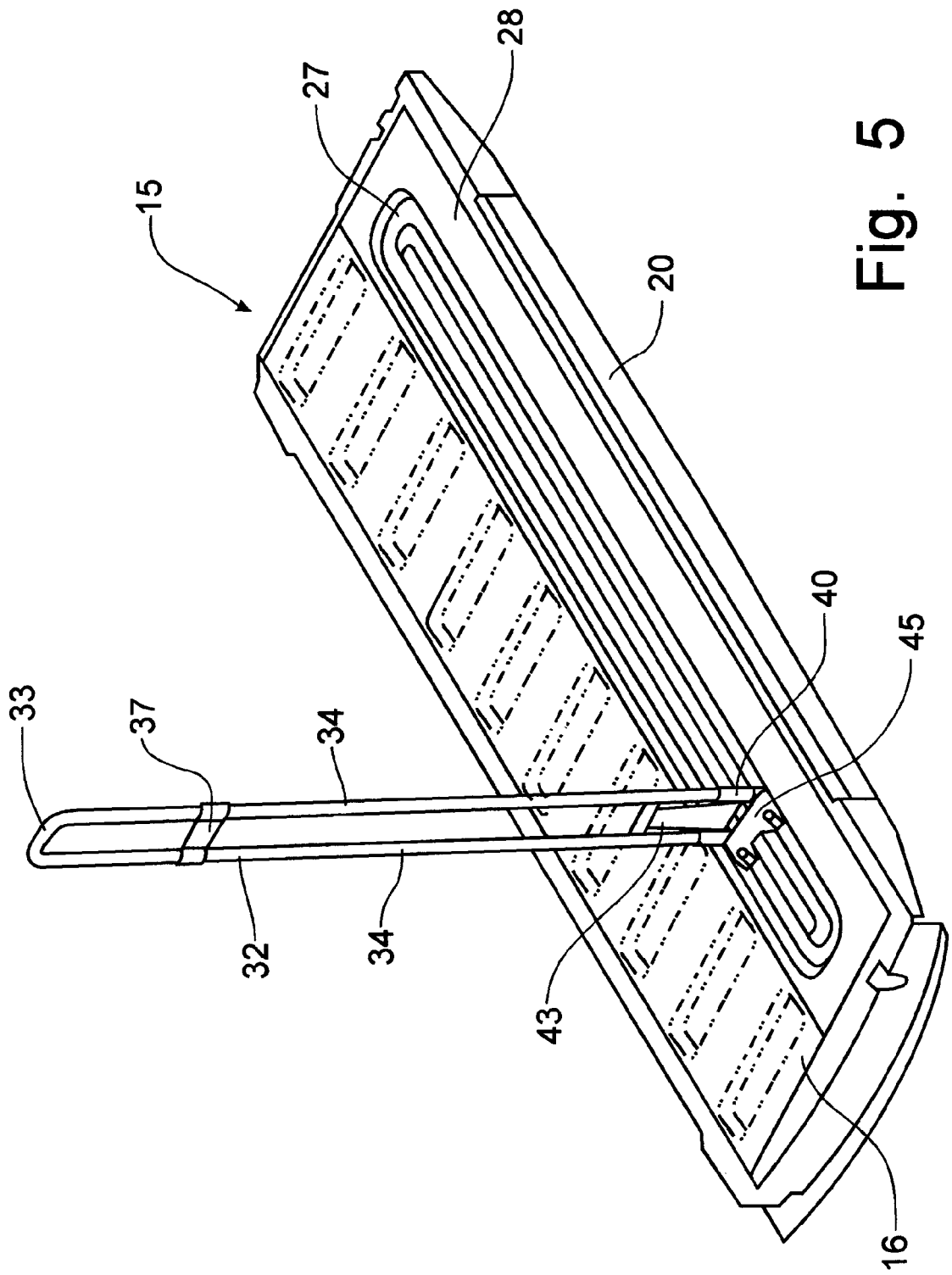
FIG. 5 is an enlarged partial perspective view of the main tailgate structure similar to that of FIG. 4, but with the grab handle shown in the deployed position.

The retainer bracket 40 is pivotally connected to a pivot bracket 45 that is clamped to the cover panel 28 by a clamping bracket 46 positioned below the cover panel 28. Preferably, the clamping bracket 46 is formed with upright supports 47, best seen in FIG. 7, that extend through appropriate openings in the cover panel 28 for engagement with the pivot bracket 45 and secured thereto by suitable fasteners (not shown). The pivot bracket 45 pivotally supports the retainer bracket 40 to permit movement thereof between the horizontal stowed position depicted in FIG. 4 and the vertical deployed position depicted in FIG. 5. Preferably the retainer bracket 40 is formed of molded plastic and can be snap fit into engagement with the pivot bracket 45. The clamping bracket 46 is preferably mounted to an anchoring bracket 49 that is affixed to the main tailgate structure 15 internally thereof in a position that would not interfere with the deployment of the supplemental tailgate assembly 20. The pivot bracket 45 is formed to provide interference with the retainer bracket 40 when the retainer bracket 40 reaches the vertical deployed position so that the retainer bracket 40 cannot pivot more than the requisite approximately 90 degrees to move the retainer bracket 40 from the horizontal stowed position to the vertical deployed position.

In operation, an operator would extend the supplemental tailgate assembly 20, as is depicted in FIG. 2, from the lowered main tailgate structure 15 and pivot the supplemental tailgate assembly 20 downwardly to the position depicted in FIG. 3 to provide the step function of the cross member 25, as is described in detail in the aforementioned U.S. patent Ser. No. 10/969,413. The grab handle member 32 would then be freed from a latching device (not shown), which serves to retain the grab handle assembly 30 in the stowed position whether the main tailgate structure 15 is raised in the closed position or lowered into the open position, and pivoted into the deployed position depicted in FIG. 5. The operator can then grasp the handle member 32, such as at the second transverse brace 37 or the bight portion 33, and use the grab handle to stabilize his body as he steps onto the cross member 25, which may have deployed a flip-out step member 26, best seen in FIG. 3. The grab handle 32 extends a sufficient height above the top surface 16 of the main tailgate 15 so that the handle 32 can provide continued stabilizing support as the operator continues his ascension onto the top surface 16 of the main tailgate 15.

Since the grab handle 32 extends substantially far above the top surface 16 of the main tailgate 15, the grab handle assembly 30 can provide stabilization for an operator descending from the main tailgate 15 onto the lowered cross member 25 of the supplemental tailgate assembly 20, and for the operator to continue his descending from the cross member 25 onto the ground. The grab handle 32 is easily deployed and returned to the stowed position and is positioned for convenient use by an operator utilizing the step function of the lowered supplemental tailgate assembly 20.

The cover panel 28 is connected to the main tailgate structure 15 by removable fasteners (not shown) to permit the disconnection of the pivot bracket 45 from the clamping bracket 46 and then completely remove the grab handle assembly 30. Furthermore, the cover panel 28 provides an access opening when removed from the main tailgate structure 15 to reach the supplemental tailgate assembly 20 while retracted internally of the main tailgate structure 15.

One skilled in the art will recognize that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In a pick-up truck having a cargo bed defined by opposing lateral upright side walls and a floor extending transversely between the side walls, and a main tailgate structure pivotally supported between said side walls for movement between an upright closed position and a lowered open position, the improvement comprising:
   a supplemental tailgate assembly housed within said main tailgate structure and being extendable from said main tailgate structure and positionable for use as a step to facilitate access onto said main tailgate structure when in said lowered open position; and
   a grab handle mounted on said main tailgate in proximity to said supplemental tailgate assembly and being pivotally movable between a stowed position and a deployed position.

2. The pick-up truck of claim 1 wherein said grab handle projects upwardly from a top surface of said main tailgate structure when in said lowered open position.

3. The pick-up truck of claim 2 wherein said grab handle comprises an elongated handle member pivotally mounted on said top surface of said main tailgate structure for movement between said stowed and deployed positions.

4. The pick-up truck of claim 3 wherein said top surface of said main tailgate structure is formed with a cover panel that includes a cradle shaped to mate with said elongated handle member so that said elongated handle member is recessed into said top surface when in said stowed position.

5. The pick-up truck of claim 4 wherein said elongated handle member is formed with a curved bight portion and a pair of legs extending from said bight portion, said grab handle further comprising a retainer bracket receiving said legs of said elongated handle member, said retainer bracket being pivotally connected to a pivot bracket for pivotal movement of said elongated handle member between said stowed and deployed positions.

6. The pick-up truck of claim 4 wherein said cover panel is detachably mounted on said main tailgate structure to permit selective access to said supplemental tailgate assembly internally of said main tailgate structure.

7. A tailgate pivotally mounted to a cargo bed of a pick-up truck to be movable between a raised closed position and a lowered open position, said tailgate having a top surface that is generally planar with said cargo bed when said tailgate is in said lowered open position, comprising:
   a housing hinged to said cargo bed and including said top surface and an opposing outer surface and defining a cavity between said top surface and said outer surface;
   a supplemental tailgate assembly mounted within said cavity defined by said tailgate housing and being movable between a stored position within said housing and one or more operative positions extended outwardly from said housing, said supplemental tailgate assembly including a cross member positionable below said lowered tailgate in one of said operative positions to provide a step function to facilitate access onto said top surface of said lowered tailgate; and a grab handle assembly pivotally mounted on said top surface for movement between a stowed position and a deployed position proximate to said supplemental tailgate assembly such that a person utilizing said step function of said supplemental tailgate can grasp said grab handle when stepping onto said cross member.

8. The tailgate of claim 7 wherein said grab handle is received within a cradle formed into said top surface of said tailgate to be recessed into said housing.

9. The tailgate of claim 8 wherein said cradle is formed into a cover panel that is detachable from said top surface to permit access to said supplemental tailgate assembly within said housing.

10. The tailgate of claim 8 wherein said grab handle assembly includes:
   an elongated handle member oriented transversely on said top surface;
   a retainer bracket connected to said handle member; and
   a pivot bracket anchored to said top surface of said tailgate housing, said retainer bracket being pivotally coupled to said pivot bracket for movement between a generally horizontal orientation corresponding to said stowed position of said handle member, and a generally vertical orientation corresponding to said deployed position of said handle member.

11. The tailgate of claim 10 wherein said elongated handle member is formed with a curved bight portion and a pair of legs extending from said bight portion, said grab handle further comprising a retainer bracket receiving said legs of said elongated handle member, said retainer bracket being pivotally connected to a pivot bracket for pivotal movement of said elongated handle member between said stowed and deployed positions.

12. The tailgate of claim 11 wherein said elongated handle member has a length greater than half of a corresponding transverse width of said tailgate so that said elongated handle member projects upwardly from said top surface sufficiently to provide support when a user is standing on said top surface.

13. A grab handle assembly mounted on a main tailgate of a pick-up truck for use in conjunction with a supplemental tailgate extendable from said main tailgate to positionable below said main tailgate when said main tailgate is oriented in a lowered open position to serve a step function to facilitate access onto said lowered main tailgate, comprising:
   an elongated handle member mounted in a stowed position on a top surface of said main tailgate when in said lowered open position proximate to said supplemental tailgate and being pivotally movable from said stowed position into a deployed position to permit a grasping thereof when a user is climbing onto said supplemental tailgate.

14. The grab handle assembly of claim 13 wherein said elongated handle member is received in a retainer bracket that is pivotally connected to a pivot bracket anchored on said top surface of said main tailgate such that said retainer bracket is movable between a generally horizontal orientation corresponding to said stowed position of said elongated handle member, and a generally vertical orientation corresponding to said deployed position of said elongated handle member.

15. The grab handle assembly of claim 14 wherein said elongated handle member is received within a cradle while in said stowed position formed into a cover panel detachably mounted on said top surface to permit access to said supplemental tailgate within said main tailgate.

16. The grab handle assembly of claim 15 wherein said cradle receives said elongated handle member to recess said elongated handle member below said top surface of said main tailgate.

17. The grab handle assembly of claim 16 wherein said elongated handle member is formed with a curved bight portion and a pair of legs extending from said bight portion, said legs being received within sleeves formed in said retainer bracket.

* * * * *